Sept. 20, 1966   J. H. BEGLE   3,273,222
CUTTING TOOL AND METHOD
Filed March 6, 1963
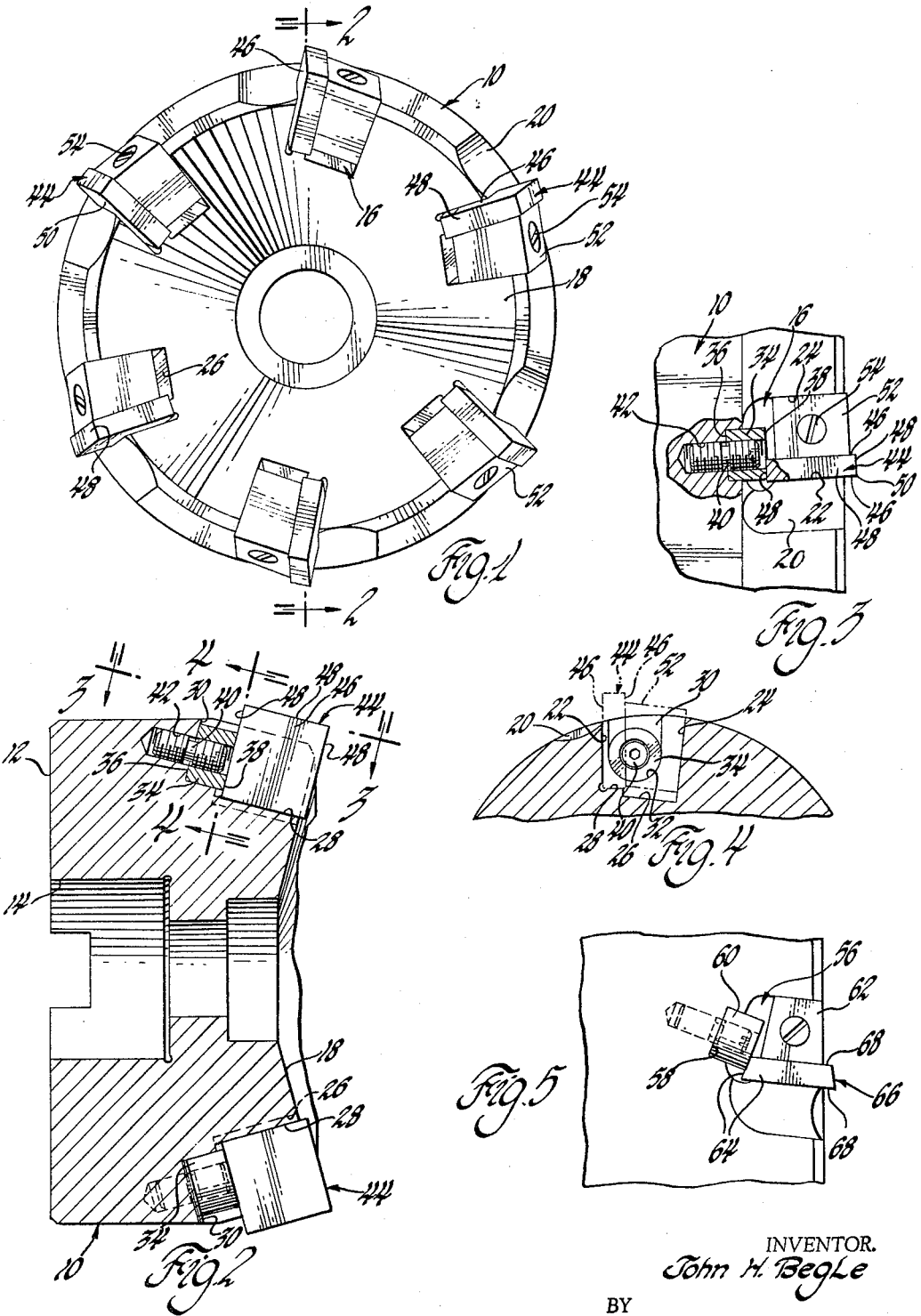
INVENTOR.
John H. Begle
BY
Barnard, McGlynn & Reising
ATTORNEYS United States Patent Office 3,273,222
Patented Sept. 20, 1966

3,273,222
CUTTING TOOL AND METHOD
John H. Begle, Northville, Mich., assignor to Futurmill, Incorporated, Southfield, Mich., a corporation of Michigan
Filed Mar. 6, 1963, Ser. No. 263,274
11 Claims. (Cl. 29—105)

This invention relates to metal cutting tools such as milling cutters and the like and, in particular, to an improved cutting tool characterized by its ease of manufacture and assembly and on-the-job maintenance.

The present invention has resulted from problems encountered in the milling cutter art and, hence, in order to facilitate an understanding thereof, the following description will be directed to the application of the invention in the milling cutter art. However, and as will become apparent as the description proceeds, the present invention may be employed in conjunction with other cutting tools and, therefore, it will be understood that the following description is by way of example only.

Milling cutters are well known in the art and typically comprise a generally disk-shaped cutter body having a center bore for removable attachment of the body to the rotatable spindle of a face mill. A back face is provided on the cutter body and is carefully machined to be exactly flat and precisely at right angles to the axis of the cutter body in accordance with conventional practice so that the body will fit snugly against the face plate of the spindle in order that the cutting blades may be properly oriented with respect to the work piece. A plurality of cutter-blade-receiving slots circumferentially spaced about the periphery of the cutter body communicate radially with such periphery and a front face of the cutter body spaced axially from the back face thereof. Cutter blades are respectively tightly removably mounted within the respective slots so as to cut or remove metal from the work piece as the cutter body is rotatably driven by the spindle of the mill.

For obvious reasons, it is absolutely essential to satisfactory operation of such a milling cutter that the various dimensional parameters governing location of the respective blades, such as radial and axial rake angles both positive and negative, radial or peripheral run out, face or axial run out, and the like, be substantially exactly uniform or held within extremely close tolerances. Over the years, conventional methods and equipment developed to so orient cutter blades in a given cutter body have imposed severe time, labor, material and equipment costs not only on the manufacturer of such milling cutters but also on the user thereof.

More specifically, as the milling cutter art has developed, it was necessary at one time to initially assemble the cutter blades on a cutter body using time-consuming and expensive gaging equipment to properly position them in accordance with given specifications. Thereafter, the respective cutter blades were individually machined while mounted in the cutter body to locate the respective cutting edges thereof in accordance with required run out tolerances. Thus, in the event that a blade or one of the mounting elements therefor was damaged in use by the milling cutter operator, the same procedures as aforementioned, either in whole or in part, were required to redress the cutter body and blades which ordinarily required removing the cutter body from the mill spindle and sending it to a special shop having the equipment and facilities to perform the dressing operation.

As the art progressed, these problems were overcome to a great extent with the advent of a cutter body in which the respective blade-receiving slots thereof were provided with very accurately machined locating surfaces against which edge surfaces of indexable blades of substantially identical size and shape could be seated and indexed to provide a plurality of cutting edges. In other words, such locating surfaces were built into the blade-receiving slots of the cutter body to accurately predetermine within extremely close tolerances such variables as radial and axial rake angles and radial or peripheral run out of the blades. Consequently, since the blades likewise were manufactured to extremely close tolerances to be substantially of uniform size, shape and the like, one such blade seated in a slot having the machined locating surfaces aforementioned would automatically assume or have the required angular relations aforementioned, and the blades could be indexed within the slots to make use of a plurality of cutting edges thereon. Hence, when a blade was severely damaged or broken in use, it was only necessary for the mill operator to remove the blade and insert another blade of the same size, shape and the like into its corresponding slot, thereby resulting in automatic orientation of the replacement blade relative to the remaining blades within the preselected tolerances.

However, even with such an advanced form of cutter body and blade assembly, problems have still been presented with respect to controlling the face or axial run out of the cutter body-blade assembly. In this regard, it is undesirable to position blades axially within a cutter body by direct engagement thereof with a surface of the body within a slot since, due to accidents which frequently occur during a milling operation, damage would otherwise result to the cutter body itself resulting in large repair or replacement expenses. Thus, in an effort to isolate the cutter body from such damage by a relatively inexpensive expendable means, it is known to press fit a locating pin into a wall of each blade-receiving slot so as to present a surface of the pin facing axially forwardly to seat against an edge surface of one of the aforementioned substantially identical indexable blades. In such an assembly, the wall of the slot receiving the pin is not deliberately machined to the tolerances required for the other machined locating surfaces aforementioned since, after the pins are installed in all of the slots, the heads or locating surfaces thereof to receive and seat against the blades are subsequently accurately ground to very close tolerances to result in the desired face or axial run out of the identical blades when they are installed in the cutter body against such pins. Such a procedure results in some economies at the factory since close tolerances are not required in machining the surface of the slot receiving the press-fit pins, while the latter can be relatively easily manufactured and ground to the desired face or axial run out.

However, such pins do require a press-fitting operation to install them in their slots and subsequent individual grinding to tolerances after all of such pins are installed in the body. Furthermore, due to the particular disposition and orientation of the blades in some cutter bodies, it is sometimes necessary to grind locating surfaces on the heads of the pins which are inclined away from normal to the axes thereof, and such an operation requires relatively elaborate gaging and measuring equipment which, although usually found at the factory, is not ordinarily available at the work site where a milling cutter is being used, but only in a special purpose tool-dressing area. Consequently, when accidents occur during operation on a workpiece causing damage to the locating surfaces of the pins as by peening them over or even fracturing them, it is necessary to remove such pin, press-fit a replacement pin in the body and grind the head thereof to provide the desired face or axial run out. In addition, particularly where the locating surface of the replacement pin must be ground in a plane not normal to the axis of the pin, the equipment to perform this operation is not ordinarily available at the site of the face mill, requiring removal of the cutter body therefrom and sending it to a special shop for dressing the replacement pin.

Another suggested approach for controlling axial or face run out while protecting the cutter body from damage has been to employ calibrated locating screws having locating surfaces engageable with an edge surface of the cutting blades which are not necessarily identical as previously described, whereby the axial or face run out of the assembled blades in the cutter body can be selected by individual adjustment of such screws. These screws have usually been either of the axial lead type or of the radial cam type in which an axial end surface or radial cam surface thereof respectively provides the adjustment. However, as will be appreciated, such screws are relatively expensive resulting in increased cost in initially manufacturing the cutter body-blade assembly and additional expenses upon replacing such a screw due to damage imposed thereon during the milling operation. Furthermore, notwithstanding the close tolerances employed, such screws are always susceptible to creeping or walking within their bores, thereby detracting from the accuracy of the face or axial run out. In addition, gaging equipment is required to accurately determine face or axial run out when initially assembling the blades against the respective screws or installing a replacement blade and, apart from the time involved to accomplish the foregoing, such equipment is not ordinarily readily available at the work site of the milling cutter.

In view of the foregoing considerations, it is a principal object and feature of the present invention to provide a cutting tool of the type comprising a rotatable cutter body, and a plurality of cutter blade-receiving slots spaced circumferentially thereabout, the respective slots being preferably formed substantially identically and provided with a seating surface cooperable with any one of a plurality of hard metal locating buttons of selected sizes removably mountable thereagainst to automatically position cutter blades mounted in the respective slots against the respective locating buttons within a predetermined run out tolerance.

It is a further object and feature of this invention to provide a cutting tool comprising a generally disk-shaped rotatable cutter body including the usual back face and a front face spaced axially therefrom, a plurality of substantially identical cutter blade-receiving slots spaced circumferentially about the body and communicating radially with the periphery and axially with the front face thereof, each of the slots being provided with accurately formed fixed locating surfaces thereon to determnie axial and radial rake angles, radial or peripheral run out and the like of individual substantially identical indexable cutting blades to be received therein, each slot further including a seating surface facing generally axially forwardly toward the front face of the cutter body, and a locating button having spaced locating surfaces thereon mounted in each slot with one of the locating surfaces thereof seated flush against the aforementioned seating surface and the other locating surface thereof adapted to engage and locate a surface of a cutter blade mounted thereagainst, the dimensions of such buttons between the aforementioned locating surfaces thereof being individually preselected in accordance with or as a function of the respective relative positions of the individual seating surfaces of the slots relative to the back face of the cutter body to position the cutter blades assembled against such buttons within a predetermined face or axial run out tolerance.

It is yet another object and feature of this invention to provide a cutting tool of the type aforementioned particularly characterized by the fact that the aforementioned locating buttons are preferably in the form of an axially extending solid hard metal cylindrical body member having axially opposed substantially parallel flat end locating surfaces for respective cooperation with the aforementioned seating surfaces of each respective blade-receiving slot of the cutter body and an edge surface of a blade to be received therein, and means removably and rotatably adjustably mounting the respective buttons within their associated slots in such a manner that, in the event of damage to a portion of a locating surface of a button engaging a blade, the button may be selectively rotatably indexed to present an undamaged portion of such locating surface to the blade to again accurately locate the latter with the desired face or axial run out, and also to permit removing the damaged button for turning it axially end-for-end to present the other undamaged locating surface to the associated blade likewise to automatically redispose the latter with the desired face or axial run out.

It is yet another object and feature of this invention to provide a cutting tool of the type aforementioned further characterized by the fact that, once a given cutter body has been provided with locating buttons of selected varying dimensions to dispose the associated blades within a predetermined axial or face run out tolerance, and in the event of the necessity of completely replacing a damaged button, the latter may be replaced by an identical button at the work site without requiring any gauging, grinding or the like whatsoever.

It is a further object and feature of this invention to provide a method of assembling a plurality of substantially identical indexable cutter blades within respective ones of a plurality of substantially identical blade-receiving slots in the body of a cutting tool having a back face disposed in reference plane, each blade including a plurality of substantially flat angularly related edge surfaces and each slot including a generally axially forwardly facing flat seating surface, which method comprises determining the relative axial positions of the respective seating surfaces relative to the aforementioned reference plane and a given axial or face run out tolerance for the cutter blades to be assembled within the respective slots, selecting one of a plurality of cylindrical hard metal locating buttons having lengths differing by predetermined amounts between opposed substantially parallel flat end locating surfaces thereof in accordance with the determination of the relative axial positions of each of the seating surfaces aforementioned, mounting each selected button in its respective slot with one locating surface thereof flush with the seating surface of such slot and the other locating surface thereof disposed to seat and locate one edge surface of one of the blades to position the latter within the desired axial or face run out tolerance, and mounting one such edge surface of each blade against the other locating surface of each button.

The inventive method and cutting tool are further characterized by the fact that neither requires machining of the aforementioned seating surfaces receiving the respective locating buttons to extremely close tolerances since the range of sizes of the selectable buttons are such that the desired axial or face run out can be built into the cutter body subsequently, while such buttons may be rotatably indexed or indexed end-for-end to present undamaged locating surface portions to a cutter blade on-the-job, or can be completely replaced by an identical button of the proper size without requiring any special gauging or grinding equipment whatsoever.

Furthermore, the invention is further characterized by the fact that the respective sizes of locating buttons may be rapidly and inexpensively manufactured on a screw machine or the like, and rapidly and inexpensively ground as by a surface grinder to the desired varying dimensions, all of which contribute to economies in manufacture of the cutter body-blade assembly and, with such a selected range of sizes of locating buttons available to the milling cutter operator, great economies being realized in the maintenance of the cutter body without requiring any gauging or grinding equipment whatsoever.

These and other objects, features and advantages of the invention will appear more fully hereinafter as the description thereof proceeds, and in which reference is made to the drawing in which:

FIGURE 1 is a front face view of a milling cutter assembly constructed in accordance with one preferred embodiment of the invention, and showing all of the cutter blades and associated instrumentalities in place ready for use;

FIGURE 2 is a sectional view taken generally on line 2—2 of FIGURE 1;

FIGURE 3 is a fragmentary view, partly broken away and in section to illustrate certain details, taken on line 3—3 of FIGURE 2;

FIGURE 4 is a fragmentary sectional view taken on line 4—4 of FIGURE 2; and

FIGURE 5 is a view generally similar to FIGURE 3, but illustrating another preferred embodiment of the invention.

Referring now to the drawings, and particularly the embodiment thereof illustrated in FIGURES 1 through 4, the milling cutter thereshown comprises a generally disk-shaped cutter body 10 including a back face 12 and the usual center bore 14 for attachment to the spindle of a face mill. The back face 12, in accordance with conventional practice, is carefully machined to be substantially precisely disposed normal to the axis of the center bore 14 so that the body will fit snugly against the usual face plate of the spindle, and for purpose of orienting the blade locating instrumentalities of the cutter body to be described and the blades themselves. A plurality of substantially identical cutter blade-receiving pockets or slots are indicated generally at 16, and are spaced circumferentially about the juncture of the periphery of the cutter body and a front face 18 thereof disposed axially opposite the back face 12. As will be apparent, each of the slots 16 communicate radially with the periphery and axially with the front face of the cutter body, and a shallow concave recess 20 is formed in the periphery of the cutter body adjacent each slot 16 and on the side thereof in the direction of rotation of the cutter body to expedite chip removal in the usual fashion.

Each pocket or slot 16 comprises a pair of circumferentially spaced opposed flat generating radially extending side walls 22 and 24 which diverge radially outwardly at a slight angle to each other, a radially inner or bottom wall 26 disposed between the aforementioned side walls and including a radially outwardly facing flat formed locating surface 28, and a radially extending generally axially forwardly facing flat formed seating surface 30 terminating at its radially innermost end in a substantially semi-circular seat 32 to receive a locating button to be described.

An axially extending cylindrical hard metal rest or locating button 34 includes two axially opposed substantially parallel flat end locating surfaces 36 and 38 and an internally threaded axially extending bore therethrough adapted to receive one set of threads of a differential screw 40, the other set of threads of which are receivable within associated internally threaded bores 42 in the cutter body. Thus, by means of a differential screw 40, the loating surface 36 of each button is held in firm flush engagement with a respective seating surface 30 with the external cylindrical configuration of the button seated in the radially innermost end 32 of the seating surfaces 30 aforementioned, while the other locating surface 38 of each button is adapted to engage and locate an edge surface of a cutter blade as will be described hereinafter.

The respective cutter blades 44 are made of a suitably hard metal such as tungsten carbide and are preferably manufactured to extremely close tolerances so as to be substantially identical in shape and dimension. More specifically, each of the cutter blades shown is rectangular and includes opposite parallel flat sides 46 and a plurality of flat edge surfaces 48 arranged in a predetermined angular relationship with each other and the blade sides 46, in this case at right angles, with each flat edge surface 48 and blade sides 46 defining a plurality of cutting edges 50 at the juncture thereof. A pair of adjacent edge surfaces 48 of each blade are adapted to be seated respectively against the radial locating surface 28 and the locating surface 38 of the corresponding rest or locating button 34 with one side 46 of such blade tightly wedged against the side wall 22 of the cutter body slot 16 by means of a metal wedge block 52 having opposed flat side surfaces respectively engaging the other side of the cutter blade and the other side wall 24 of the slot. It will be noted particularly from FIGURES 3 and 4 that only a portion of locating surface 38 engages the edge surface of a button. Screws 54 extend through the respective wedge blocks in a radial direction and are threaded into the cutter body through the bottom walls 26 of the slots to thereby securely removably retain the wedge blocks and cutter blades in the respective slots as shown. The relative dimensions of the wedge block and respective blades are such that the blades extend radially and axially beyond the wedge blocks while the axially rearward faces of the wedge blocks provide the necessary clearance for the rest or locating button 34. Although a rectangular blade has been shown in the drawing and described above, the particular shape of the blades is immaterial to the present invention and may be of other polygonal forms although, as with the particular blade shown and described above, it is preferred that any given blade be substantially uniform in size and shape so as to be completely indexible within its associated slot to present different ones of its cutting edges for use in a manner known to the art.

In manufacturing the cutter body 10, the respective side walls 22 and 24 of each slot and the radial locating surface 28 are accurately machined to relatively close tolerances to provide the desired axial and radial rake angles, lead angle and radial or peripheral run out for the assembled tool. Thus, upon tightly clamping the substantially identical cutter blades 44 within their associated slots in engagement with the side walls 22 and the locating surfaces 28, they will all be automatically uniformly positioned or oriented in the particulars aforementioned.

However, the respective seating surfaces 30 need not be machined in the cutter body to such close tolerances and, in the cutter body shown, are normally held to one-thousandth of an inch. The hard metal rest or locating buttons 34 may be easily and rapidly manufactured totally apart from manufacture of the cutter body 10 on a screw machine or the like and then, by use of a surface grinder or the like, the flat locating surfaces 36 and 38 may be provided rapidly thereon. In this regard, buttons are provided in a plurality of graduated sizes or axial lengths between the locating surfaces 36 and 38 thereof to insure that at least one of the buttons, when the locating surface 36 thereof is mounted on a seating surface 30 associated with a slot 16, will have the other locating surface 38 thereof disposed in position to automatically provide the desired face or axial run out for the respective blade seated thereagainst. In the milling cutter shown, three sizes of buttons are provided varying in axial length between their end locating surfaces 36 and 38 by approximately three ten-thousandths of an inch for the purpose aforementioned, and as indicated in FIGURE 2.

In assembling the blades on the cutter body, the axial positions of the respective seating surfaces 30 relative to the reference plane afforded by the back face 12 of the cutter body are determined in the known manner and, taking into consideration the specified axial or face run out tolerance for the assembled cutter blades 34, a particular one of the three sizes of buttons 34 is selected for each individual seating surface 30 and is mounted thereagainst as previously described, followed by assembly of the blades and wedge blocks also previously described. As a result, the specified axial or face run out is provided.

With a given assembled cutter installed on the spindle of a milling machine and in use on a work piece, it may be assumed that a selected cutting edge 50 of a particular blade becomes worn to an extent requiring a new cutting edge. Under these circumstances, the screw 40 is loosened to loosen the associated wedge block 52 to permit indexing of the affected blade in a known manner to provide a new cutting edge, at which time the blade is reseated and the wedge block retightened. Naturally, the same procedure may be followed in the event that a given blade needs to be replaced. In any event, it will be apparent that indexing or replacing a blade still results in positioning the latter within the specified axial or face run out tolerance as well as the various other tolerances aforementioned.

In the event that the portion of a locating surface 38 of a button 34 engaging an edge surface 48 of a blade is damaged as by being peened over as often happens during use, the blade and wedge block may be removed from the slot and the differential screw 40 may be backed out of the bore 42 in the cutter body 10 to an extent permitting rotary indexing of the button on the screw to expose a fresh undamaged portion thereof in position to engage the edge surface of the blade, at which time the differential screw is then threaded back into the cutter body to redispose its one locating surface 36 flush with the seating surface 30. Thereafter, the blade and wedge block are reassembled without disturbing the axial or face run out of the cutter. It will also be apparent that a button may be entirely removed and indexed or turned end-for-end to present the other locating surface 36 thereof to the blade.

In the event that a given button 34 must be replaced, it is only necessary for the milling cutter operator to select a replacement button identical in size to the replaced button previously or initially installed in the cutter body, and to mount the replacement button as aforedescribed. As a result, without any gauging, grinding or the like whatsoever, the replacement blade is automatically disposed in the desired position in its slot, particularly with respect to the desired face or axial run out tolerance.

It will now be apparent that the invention is equally applicable to milling cutters having rake angles other than that of the cutter of the FIGURES 1–4 embodiment, and irrespective of what the rake angles might be. This aspect of the invention is illustrated in FIGURE 5 which shows the invention embodied in a milling cutter having a positive radial rake as compared to the negative radial rake of the previous embodiment. In this embodiment, the slots 56 in the cutter body correspond to the slots 16 in the embodiment previously described, except that the respective seating surfaces 58 thereof are at considerable radial angle to the axis of rotation of the cutter body, and the cylindrical rest or locating buttons 60 are assembled, positioned and held in the slots in the manner previously described utilizing the wedge blocks 62. While the angular orientation of the flat edge surfaces 64 of the blades 66 with the flat sides 68 thereof differs from that previously described, the blades are still preferably identical to each other for indexing purposes aforementioned. Thus, in this embodiment, the relative axial positions of the respective seating surfaces 58 are determined relative to the back face of the cutter body and related to the axial or face run out tolerance, and a button of a selected size installed as shown at FIGURE 5 for the purposes aforementioned.

While but two forms of the invention have been shown and described, other forms will now be apparent to those skilled in the art. Therefore, it will be understood that the embodiments shown in the drawing and described above are merely for illustrative purposes, and are not intended to limit the scope of the invention which is defined by the claims which follow.

I claim:

1. A cutting tool comprising a rotatable cutter body, means defining a plurality of cutter-blade receiving slots spaced about said cutter body and each including a seating surface, a plurality of locating members respectively mountable within said slots and each including a pair of spaced locating surfaces, one of said locating surfaces of each of said locating members being mountable in engagement with the seating surface of a respective slot and the other locating surface thereof being adapted to seat and locate a surface of a respective cutter blade, and mounting means rotatably adjustably mounting said respective locating members in said respective slots whereby, in the event of damage to a portion of a locating surface of a given locating member seating a cutter blade, said locating member may be rotatably indexed to a different rotary position to present an undamaged portion of said last-named locating surface to the cutter blade.

2. A cutting tool comprising a rotatable cutter body, means defining a plurality of cutter-blade receiving slots spaced about said cutter body and each including a flat seating surface, a plurality of locating members respectively mountable within said slots and each including a pair of spaced flat parallel locating surfaces, one of said locating surfaces of each of said locating members being mountable in flush engagement with the seating surface of a respective slot and the other locating surface thereof being adapted to seat and locate a surface of a respective cutter blade, and mounting means rotatably adjustably mounting said respective locating members in said respective slots whereby, in the event of damage to a portion of a locating surface of a given locating member seating a cutter blade, said locating member may be rotatably indexed to a different rotary position to present an undamaged portion of said last-named locating surface to the cutter blade.

3. A cutting tool as defined in claim 2 wherein said mounting means removably mounts said respective locating members within said respective slots whereby, in the event of damage to a locating surface of a given locating member seating a respective cutter blade, said locating member may be removed from its slot and indexed to present the other locating surface thereof to said blade.

4. A cutting tool as defined in claim 3 wherein each of said locating members is cylindrically shaped and of solid hard metal, said pair of locating surfaces being positioned at opposite ends of said respective cylindrically shaped locating members, and wherein said mounting means comprises a threaded screw extending axially of said respective cylindrically shaped locating members from between said locating surfaces thereof through said respective seating surfaces into said cutter body.

5. A cutting tool comprising a rotatable cutter body including a back face and a front face spaced axially therefrom, a plurality of substantially identical indexable cutter blades extending edgewise into said body at the juncture of the periphery and said front face thereof, said blades being of hard wear-resistant composition and having opposite parallel sides and a plurality of edge surfaces arranged generally in the form of a polygon, said edge surfaces being disposed at angles to said side surfaces to form cutting edges at the junction thereof, a generally axially forwardly facing flat seating surface fixedly formed on said cutter body in association with each of said cutter blades, a locating member associated with each of said seating surfaces and each including a pair of flat parallel locating surfaces disposed in predetermined spaced relation to each other, one of said locating surfaces of said respective locating members being mounted in flush engagement with a respective one of said seating surfaces and the other locating surface thereof engaging and seating one of said edge surfaces of a respective cutter blade, the predetermined spaced relationship of the locating surfaces of each locating member being such relative to the positions of said seating surfaces to position the cutter blades within a predetermined face run-out tolerance, and mounting means rotatably adjustably mounting said respective locating members in flush engagement with said respective seating surfaces whereby, in the event of damage to a portion of a locating surface of a given locating member seating a cutter blade, said locating member may be rotatably indexed to a different rotary position in flush engagement with said seating surface to present an undamaged portion of said last-named locating surface to the cutter blade.

6. A cutting tool as defined in claim 5 wherein said mounting means removably mounts said respective locating members in flush engagement with said respective seating surfaces whereby, in the event of damage to a locating surface of a given locating member seating a respective cutter blade, said locating member may be removed and indexed end-to-end to present the other locating surface thereof to the cutter blade.

7. A cutting tool as defined in claim 6 wherein each of said locating members is cylindrically shaped and of solid hard metal, said pair of locating surfaces being positioned at opposite ends of said respective cylindrically shaped locating members, and wherein said mounting means comprises a threaded screw extending axially of said respective cylindrically shaped locating members from between said locating surfaces thereof through said respective seating surfaces into said cutter body.

8. A cutting tool comprising a generally disk-shaped rotatable cutter body including a back face and a front face spaced axially therefrom, and a plurality of cutter blade-receiving slots spaced circumferentially about said cutter body and communicating with said front face thereof, each of said slots including a generally axially forwardly facing flat seating surface fixedly formed on said cutter body and receiving a selected one of a plurality of cylindrical locating buttons having different lengths between axially opposed substantially parallel flat locating surfaces thereof, one of said locating surfaces of each of said selected buttons being mounted in flush engagement with the seating surface of a respective slot and the other locating surface thereof being adapted to seat and locate a flat edge surface of any one of a plurality of substantially identical cutter blades, the lengths of said respective selected locating buttons being individually preselected in accordance with the respective positions of said seating surfaces of said respective slots relative to said back face of said cutter body to position the cutter blades within a predetermined face run out tolerance, and means rotatably adjustably mounting said respective locating buttons in said respective slots whereby, in the event of damage to a portion of a locating surface of a given locating button seating a cutter blade, said locating button may be rotatably indexed to a different rotary position to present an undamaged portion of said last-named locating surface to the cutter blade.

9. A cutting tool comprising a generally disk-shaped rotatable cutter body including a back face and a front face spaced axially therefrom, and a plurality of cutter blade-receiving slots spaced circumferentially about said cutter body and communicating with said front face thereof, each of said slots including a generally axially forwardly facing flat seating surface fixedly formed on said cutter body and receiving a selected one of a plurality of cylindrical locating buttons having different lengths between axially opposed substantially parallel flat locating surfaces thereof, one of said locating surfaces of each of said selected buttons being mounted in flush engagement with the seating surface of a respective slot and the other locating surface thereof being adapted to seat and locate a flat edge surface of any one of a plurality of substantially identical cutter blades, the lengths of said respective selected locating buttons being individually preselected in accordance with the respective positions of said seating surfaces of said respective slots relative to said back face of said cutter body to position the cutter blades within a predetermined face run out tolerance, and means removably mounting said respective locating buttons within said respective slots whereby, in the event of damage to a locating surface of a given locating button seating a respective cutter blade, said locating button may be removed from its slot and indexed end-to-end to present the other locating surface thereof to the cutter blade.

10. A cutting tool comprising a generally disk-shaped rotatable cutter body including a back face and a front face spaced axially therefrom, a plurality of substantially identical indexable cutter blades extending edgewise into said body at the juncture of the periphery and said front face thereof, said blades being of hard wear-resistant composition and having opposite parallel sides and a plurality of edge surfaces arranged generally in the form of a polygon, said edge surfaces being disposed at angles to said side surfaces to form cutting edges at the junction thereof, a generally radially outwardly facing flat locating surface engaging and seating one of said edge surfaces of each blade, said respective locating surfaces being fixedly formed on said cutter body in predetermined known substantially identical positions relative to the axis of rotation of the latter to position the respective cutter blades within a predetermined peripheral run out tolerance, a generally axially forwardly facing flat seating surface fixedly formed on said cutter body in association with each of said cutter blades, and an axially extending cylindrical hard metal locating button mounted on each of said axially forwardly facing seating surfaces, each of said locating buttons having axially opposed substantially parallel flat locating surfaces, one of said locating surfaces of said respective buttons being mounted in flush engagement with a respective one of said axially forwardly facing seating surfaces and the other locating surface thereof engaging and seating another of said edge surfaces of a respective blade, the axial lengths of said respective buttons between said locating surfaces thereof being individually preselected in accordance with the respective positions of said axially forwardly facing seating surfaces relative to said back face of said cutter body to position said cutter blades within a predetermined face run out tolerance, and means rotatably adjustably mounting said respective locating buttons in said respective slots whereby, in the event of damage to a portion of a locating surface of a given locating button seating a cutter blade, said button may be rotatably indexed to a different rotary position to present an undamaged portion of said last-named locating surface to the cutter blade.

11. A cutting tool comprising a generally disk-shaped rotatable cutter body including a back face and a front face spaced axially therefrom, a plurality of substantially identical indexable cutter blades extending edgewise into said body at the juncture of the periphery and said front face thereof, said blades being of hard wear-resistant composition and having opposite parallel sides and a plurality of edge surfaces arranged generally in the form of a polygon, said edge surfaces being disposed at angles to said side surfaces to form cutting edges at the junction thereof, a generally radially outwardly facing flat locating surface engaging and seating one of said edge surfaces of each blade, said respective locating surfaces being fixedly formed on said cutter body in predetermined known substantially identical positions relative to the axis of rotation of the latter to position the respective cutter blades within a predetermined peripheral run out tolerance, a generally axially forwardly facing flat seating surface fixedly formed on said cutter body in association with each of said cutter blades, and an axially extending cylindrical hard metal locating button mounted on each of said axially forwardly facing seating surfaces, each of said locating buttons having axially opposed substantially parallel flat locating surfaces, one of said locating surfaces of said respective buttons being mounted in flush engagement with a respective one of said axially forwardly facing seating surfaces and the other locating surface thereof engaging and seating another of said edge surfaces of a respective blade, the axial lengths of said respective buttons between said locating surfaces thereof being individually preselected in accordance with the respective positions of said axially forwardly facing seating surfaces relative to said back face of said cutter body to position said cutter blades within a predetermined face run out tolerance, and means removably mounting said respective locating buttons within said respective slots whereby, in the event of damage to a locating surface of a given locating button seating a respective cutter blade, said locating button may be removed from its slot and indexed end-to-end to present the other locating surface thereof to the cutter blade.

References Cited by the Examiner

UNITED STATES PATENTS

| 1,144,131 | 6/1915 | Hunter | 29—105 |
|---|---|---|---|
| 2,814,854 | 12/1957 | Murray. | |
| 2,930,111 | 3/1960 | St. Clair. | |
| 3,104,452 | 9/1963 | Greenleaf | 29—96 |

FOREIGN PATENTS

| 1,203,472 | 7/1959 | France. |
|---|---|---|
| 1,203,473 | 7/1959 | France. |
| 667,936 | 3/1952 | Great Britain. |
| 832,328 | 4/1960 | Great Britain. |

WILLIAM W. DYER, Jr., *Primary Examiner.*

H. L. HINSON, *Assistant Examiner.*